Figure 1:
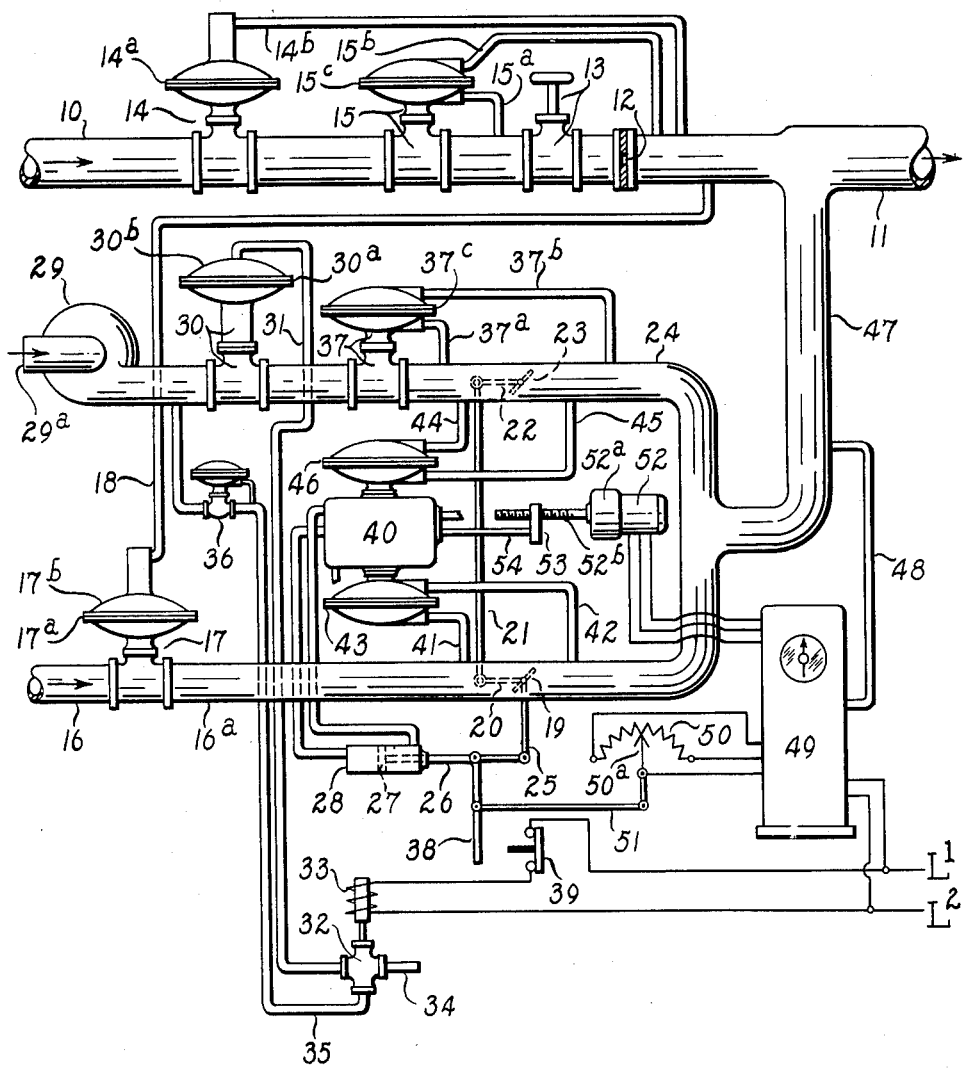

Sept. 27, 1955  E. X. SCHMIDT ET AL  2,719,080
GAS MIXING CONTROL METHODS AND APPARATUS
Filed Oct. 23, 1951  3 Sheets-Sheet 2

Inventors
Edwin X. Schmidt
Charles W. Warner
By W. C. Lyon
Attorney

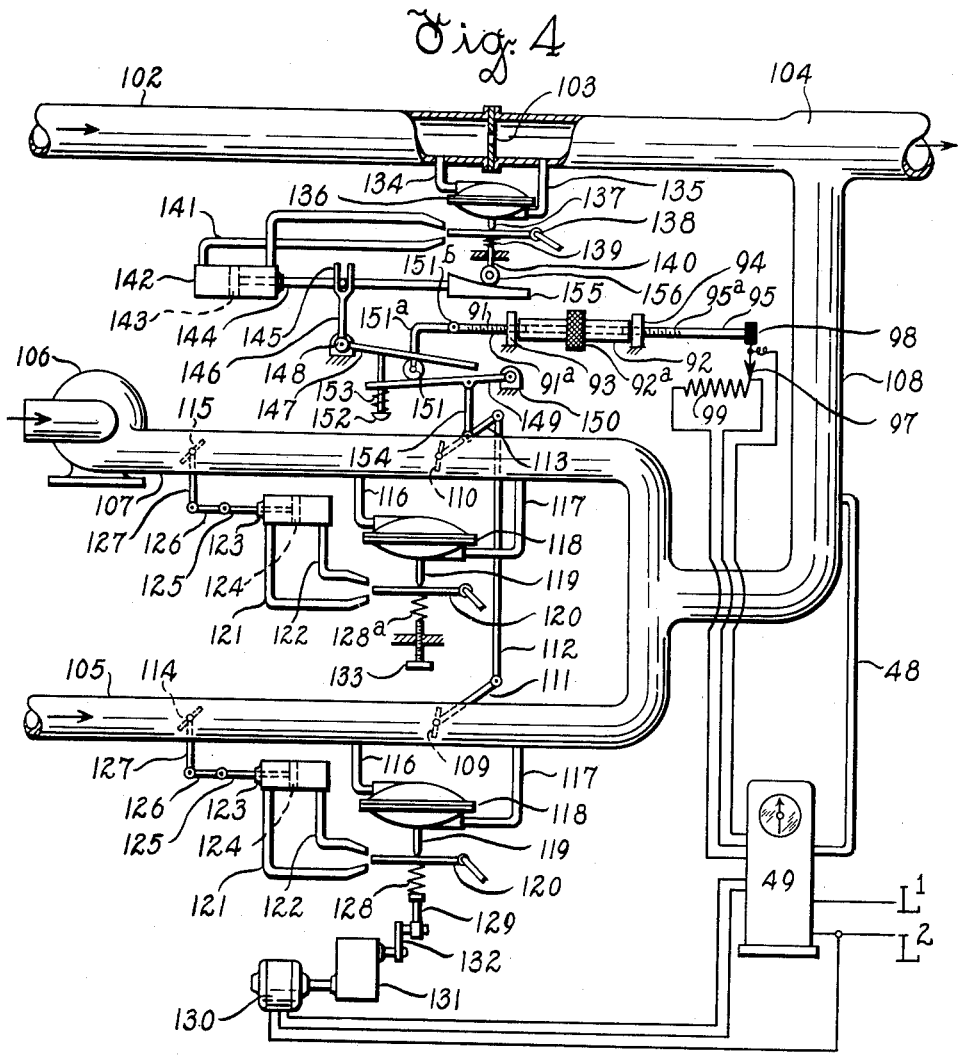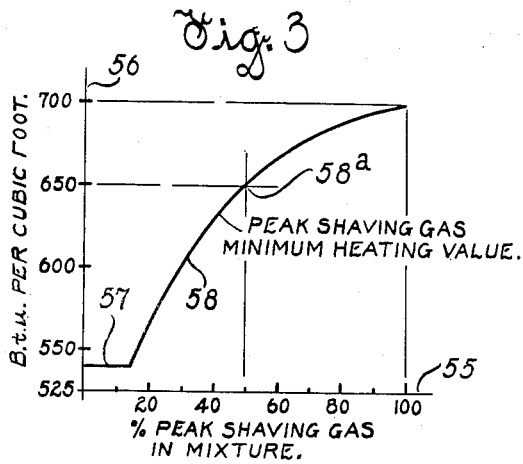

United States Patent Office 2,719,080
Patented Sept. 27, 1955

2,719,080

GAS MIXING CONTROL METHODS AND APPARATUS

Edwin X. Schmidt, Chenequa, and Charles W. Warner, Wauwatosa, Wis.

Application October 23, 1951, Serial No. 252,694

8 Claims. (Cl. 48—184)

This invention relates to improvements in gas mixing control methods and apparatus, and although not limited thereto the invention relates more particularly to such methods and apparatus adapted for peak shaving.

This application is a divisional application of our Patent No. 2,608,199, dated August 26, 1952.

In the operation of gas utilities it frequently becomes necessary or desirable to supplement the normal maximum supply of gas by an auxiliary supply consisting of a mixture with air of a liquid petroleum gas or gases. However, a mixture of such gases (propane and/or butane) with air which will function satisfactorily on gas burning appliances when used alone or as a relatively large percentage of the gas flow, invariably requires a heating value thereof which is substantially higher than that of the base gas. The result is that more potential heat is delivered to the domestic consumer per unit of volume, and the income of the gas company is reduced due to the lower volumetric consumption. Therefore when the demand for gas requires the use of a supplementary fuel, or peak shaving gas, it is desirable that such additional gas be supplied at the minimum heating value which will not cause trouble on consumer appliances. Moreover, inasmuch as the proportionality of the peak shaving gas in the mixture determines the amount of increase in heating value required to eliminate burner trouble, the volume of peak shaving gas must be properly proportioned with respect to the volumetric rate of flow of the base gas, and the heating value of the peak shaving gas should have a definite relationship to the preselected proportionality.

Assuming that a utility normally supplies carbureted water gas of 540 B. t. u. per cubic foot, a propane-air mixture of 720 B. t. u. would theoretically be required to provide for substitution thereof completely for the carbureted water gas (100 per cent interchangeability). However, we have found that a 700 B. t. u. mixture of propane and air will afford satisfactory burner performance. Similarly, we have found that a mixture of carbureted water gas of the aforementioned quality with up to about 15 per cent of 540 B. t. u. propane-air (peak shaving) gas will likewise afford satisfactory burner performance. On the other hand, if one-half of the final mixture consists of carbureted water gas of the aforementioned quality and the balance a propane air-gas mixture, a heating value of the latter of about 650 B. t. u. is required.

Furthermore, in the delivery of natural gas by pipe line companies to distribution companies, the contracts almost invariably prescribe maximum delivery rates; so that an auxiliary supply of peak shaving gas is absolutely necessary. Even in those cases where the demand by the distribution company is permitted to exceed the maximum delivery rate specified in the contract, the charge per unit volume for the excess gas required to be supplied by the pipe line company will ordinarily be substantially greater than for that supplied just below the maximum delivery rate agreed upon.

A primary object of our invention is to provide novel methods of and apparatus for accomplishing the desirable results aforementioned.

Another object is to provide for use of any required volume of the peak shaving gas without deleteriously affecting the combustion or burner characteristics of the final mixture.

Another object is to minimize the required quality or heating value of the peak shaving gas when supplied.

Another and more specific object is to provide methods of and apparatus for automatically varying the quality of the peak shaving gas in accordance with variations in the proportionality or volume thereof required to be supplied.

Other objects and advantages of the invention will hereinafter appear.

The accompanying drawings illustrate certain embodiments of our invention which will now be described; it being understood that the invention is susceptible of embodiment in other forms within the scope of the appended claims.

In the drawings, Figure 1 illustrates schematically and diagrammatically a fully automatic peak shaving gas mixing control system constructed in accordance with our invention.

Figure 2:
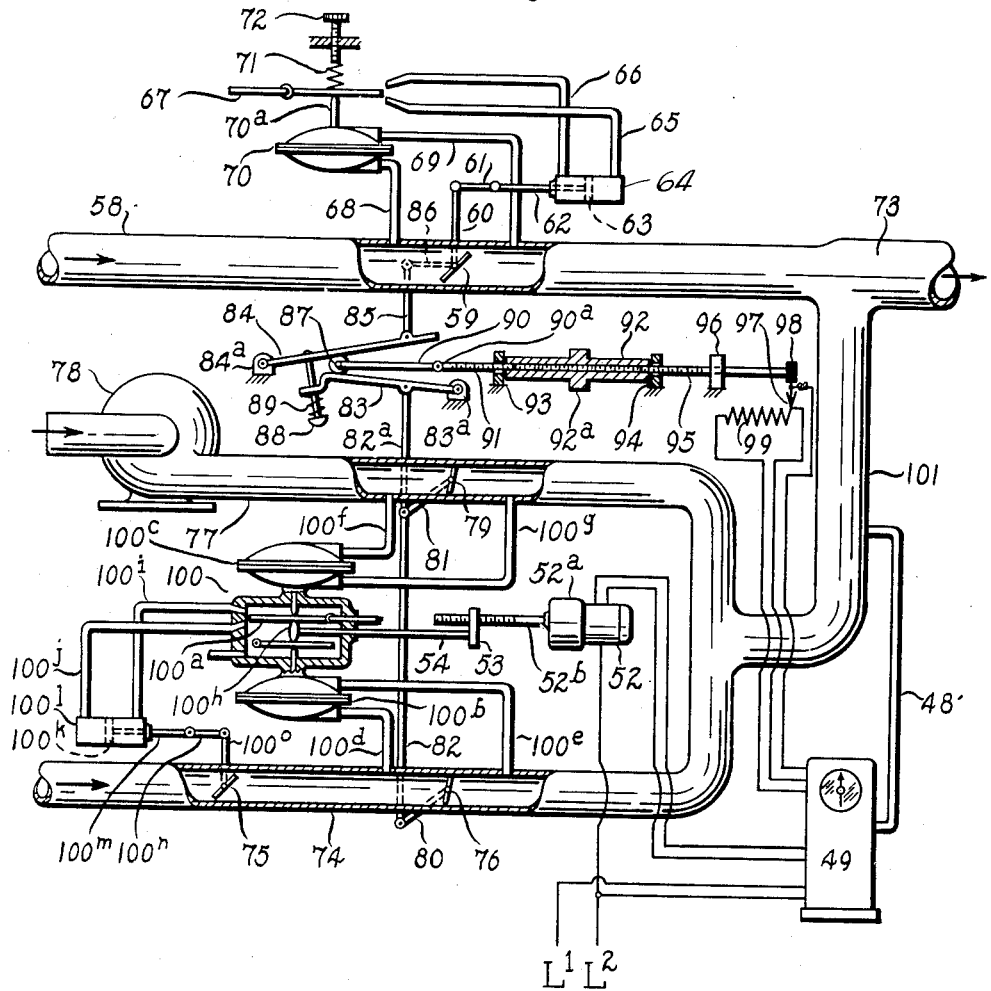

Fig. 2 illustrates a modified and simplified form of our invention, wherein a flow of peak shaving gas is effected at all times for mixture with the base gas flow, the percentage flow of peak shaving gas being normally maintained low enough to avoid the necessity for any excess in the total heating value per unit volume thereof with respect to that of the base gas; the system of this figure including a hand set selector which not only controls the proportionality of the flow of peak shaving gas with respect to the base gas, but also effects the setting of the associated means for control of the total heating value per unit volume of the peak shaving gas.

Fig. 3 is a graph illustrating the increase required in the minimum quality or heating value of the peak shaving gas according to the volumetric proportionality thereof necessary for mixture with a base gas, such as carbureted water gas of 540 B. t. u. per cubic foot, whereby satisfactory burner performance of the complete mixture is insured, and Fig. 4 illustrates another form of our invention which is functionally quite similar to that shown in Fig. 2.

Referring to that form of our invention illustrated in Fig. 1, the numeral 10 designates a conduit through which gas from a suitable relatively high pressure source is supplied to a line or conduit, designated by numeral 11, for distribution to consumers. The gas supplied through conduit 10 may be of any suitable character, such as natural gas, carbureted water gas, or the like. This gas will hereinafter be referred to as the base gas which will normally have predetermined substantially constant values of: total heat per unit volume, density and combustion characteristics. By way of example, it will be assumed that such base gas consists of a typical carbureted water gas of 540 B. t. u. per cubic foot.

Conduit 10 is provided with a fixed orifice 12, a hand set valve 13, a first pressure regulator, designated in general by numeral 14, and a second pressure regulator 15, which is in the form of a pressure difference regulator. Regulator 14 is of a known form wherein the valve portion (not shown) is adjustably biased toward fully opened position; the regulator including a diaphragm 14$^a$ whose upper surface is subjected, through pipe 14$^b$, to the pressure of gas at the downstream side of orifice 12. Regulator 14 thus serves to initially control the distribution pressure, within conduit 11. As the required flow (to meet the demand from conduit 11) approaches a preselected maximum value, as indicated by the orifice meter (comprising orifice 12, pipes 15$^a$ and 15$^b$ and diaphragm 15ᶜ), the pressure drop across the orifice 12 and hand set valve 13 approaches the preselected setting of the pressure difference regulator 15, whereupon the regulator 15 moves automatically toward closed position, thus limiting the flow to establish a fixed or constant pressure drop across the orifice 12 and hand set valve 13 jointly. Inasmuch as the amount of restriction is fixed by valve 13 and orifice 12, such constant pressure drop determines the rate of flow of the gas in conduit 10, and if this flow is insufficient to satisfy the demand, the distribution pressure (in conduit 11) will fall. In attempting to compensate for this fall in pressure, the valve associated with pressure regulator 14 may go toward or to its fully opened position, but this will not affect the flow of gas through conduit 10, because the control of flow has been taken over by the pressure difference regulator 15.

Thus upon proper adjustment of valve 13 and adjustment or calibration of pressure difference regulator 15 the same will cooperate with orifice 12 to limit the maximum volumetric rate of flow of gas through conduit 10 to conduit 11, in accordance with the contract with a pipe line company, as aforedescribed. It follows that, if the rate of demand from the distribution line 11 is greater than the aforementioned maximum volumetric rate of supply through conduit 10, the gas pressure in line 11 will fall below the predetermined desired pressure therein. Therefore it is necessary to provide an auxiliary supply of gas, suitable for mixture with the base gas supplied through conduit 10, to satisfy the demand for gas beyond said maximum volumetric rate of supply of the base gas, and to maintain a substantially constant pressure of the gas within distribution line 11.

In Fig. 1 we have illustrated means operable automatically to suppply the additional volume of gas to meet the excessive demand from distribution line 11, whereby the pressure in the latter is maintained at a predetermined substantially constant value. The means now to be described are also adapted to act automatically to control the quality or total heating value per unit volume of the auxiliary supply of gas at a minimum value (which, however, will under no conditions be less than the quality or total heating value per unit volume of the base gas); thus minimizing the excess in quality or richness of the gas supplied to distribution line 11 when the demand is greater than the predetermined maximum rate of supply of base gas. Such minimized quality of the auxiliary supply of gas is likewise automatically varied, in accordance with variations in the rate of demand, in such a manner as to insure against improper combustion characteristics of the gas at the various points of consumption.

It may be assumed, for example, that conduit 10 is connected with a high pressure source of supply of base gas of 540 B. t. u. per cubic foot; the aforedescribed elements 12, 13 and 14 acting to normally insure a predetermined relatively lower pressure of the gas within distribution line 11. Further it may be assumed that the auxiliary gas (propane, for example) is supplied to a conduit 16 at a pressure normally substantially higher than the predetermined relatively low pressure which it is desired to maintain in the distribution line 11.

Associated with conduit 16 is a so-called low pressure gas regulator 17 of known form, which includes a valve (not shown) which is normally biased to open position to provide a free flow of the propane into the portion 16ᵃ of conduit 16. However, a pipe 18 affords communication between the conduit 10 at the downstream side of orifice 12 and the chamber 17ᵇ which opens to the upper surface of a diaphragm 17ᵃ; the arrangement being such that the valve of regulator 17 will be maintained closed so long as the pressure in distribution conduit 11 does not fall below the pressure preselected therefor. Upon a decrease in the distribution pressure below said preselected value, as aforedescribed, the valve of regulator 17 will open, thus providing a flow of propane through conduit portion 16ᵃ; which in turn results in a pressure drop across the butterfly valve 19. Valve 19 is connected by suitable linkage 20, 21 and 22 with a butterfly valve 23 located in the air line or conduit 24; said valves preferably being arranged at like angles in each of their various positions during joint operation thereof. The means for effecting movement of valves 19 and 23 comprises linkage 25 and 26; link 26 consisting of a rod attached to a piston 27, which is movable toward one end or the other of a cylinder 28 under conditions hereinafter described.

Conduit 24 has its left-hand end connected with any suitable source of air under pressure; such source being represented in Fig. 1 by a power-driven blower or pump designated by numeral 29, the inlet end of which is shown at 29ᵃ. Located within conduit 24 is a shut-off valve 30 of known form, which is normally biased to its closed position as by means of a spring (not shown), or the like. A chamber 30ᵇ above a diaphragm 30ᵃ is connected by pipe 31 with a three-way solenoid-operated valve 32, the operating coil of which is designated by numeral 33. When coil 33 is deenergized valve 32 is adapted to move to a position wherein pipe 31 is vented to atmosphere, through a pipe or opening 34, and to disconnect from pipe 31 the supply of air under pressure, through pipe 35, from the conduit 24 at the left-hand side of shut-off valve 30. Pipe 35 preferably has located therein a pilot regulator 36 of known form, whereby the pressure of air supplied to valve 32 is limited to a predetermined value. However, when coil 33 is energized, as illustrated, valve 32 acts to disconnect pipe 31 from vent 34 and to connect the former with pipe 35, whereby valve 30 is moved to fully open position against the normal bias thereof.

Also located within conduit 24 at the upstream side of butterfly valve 23 is a pressure difference regulating valve 37 (substantially like the regulator 15 aforementioned), the same having pipes 37ᵃ and 38ᵇ respectively connecting the conduit 24 at the upstream and downstream sides of butterfly valve 23 with the chambers at the lower and upper sides of a diaphragm 37ᶜ.

Thus, assuming that valves 19 and 23 were in fully closed position at the time the valve of regulator 17 was opened (due to a decrease in pressure of the gas in distribution line 11, as an incident to an increase in demand beyond the permissible volumetric rate of flow of the base gas), the element 38 carried by the aforementioned link 26 will have acted upon the normally closed limit switch 39 to effect opening thereof, with consequent deenergization of coil 33, for the purpose aforedescribed.

A fluid pressure operated ratio controller 40, of the general character disclosed in Wunsch Patent No. 1,558,529, dated October 27, 1925, and more particularly of the character shown in Fig. 1 of Schmidt and Brice Patent No. 1,999,740, granted April 30, 1935, is employed to effect movement of piston 27, with consequent joint operation of valves 19 and 23. More particularly, the pipes 41 and 42 respectively afford communication between portion 16ᵃ of conduit 16 at the upstream and downstream sides of valve 19 and the lower and upper sides of a diaphragm 43; whereas the pipes 44 and 45 respectively afford communication between conduit 24 at the upstream and downstream sides of valve 23 and the upper and lower sides of a diaphragm 46. Because the valve 30 is closed, as aforedescribed, at the time of opening of the valve of regulator 17, there will be no pressure drop across the air line butterfly valve 23, so that the resultant pressure drop across valve 19 will act in a well known manner to effect movement of piston 27 toward the left. Such movement of piston 27 not only effects movement of valves 19 and 23 jointly from their closed position, but the resultant movement of element 38 toward the left also permits limit switch 39 to move to its normally closed position, as illustrated. The consequent opening of shut-off valve 30 permits air to flow through conduit 24; the pressure difference regulator 37 in conduit 24 controlling the pressure drop across butterfly valve 23 to maintain said pressure drop of substantially constant value. If the pressure drop across the low pressure gas butterfly valve 19 continues to exceed the pressure drop across the air line butterfly valve 23 the duplex valves 19, 23 will continue to open jointly until said pressure drops are equalized; with the volumetric rate of flow of the mixture of low pressure gas (propane) and air through conduit 47 of the value necessary to maintain the gas pressure in the distribution conduit 11 at the desired value, for which the low pressure gas regulator 17 is set. As the demand for peak shaving gas (from conduit 47) decreases, due to a decrease in the demand for gas from the distribution line 11, the duplex valves 19 and 23 will move jointly toward their closed positions and eventually shut off the flow of low pressure gas through portion 16ª of conduit 16 and the flow of air through conduit 24; the limit switch 39 being opened, as an incident to closure of said valves 19 and 23, to deenergize coil 33, with resultant closure of the shut-off valve 30 in the air line 24.

It is obvious that when peak shaving gas is being added to the distribution conduit 11 the rate of flow of the base gas through conduit 10 is at a preselected maximum value; and that, therefore, the volumetric rate of flow of the peak shaving gas is definitely related to the volumetric rate of flow of such base gas. Inasmuch as the pressure drop across the air valve 23 is maintained at a constant value, by the differential pressure regulator 37, the position of the valves 19 and 23 jointly affords a definite indication of the volumetric rate of flow of air, which in turn is definitely related to the volumetric rate of flow of the peak shaving gas (propane-air mixture flowing through conduit 47). Said volumetric rate of flow of the propane-air mixture then determines the minimum heating value thereof which will afford a satisfactory mixture when the same is combined with the base gas flowing in distribution line 11.

In accordance with our invention a continuous sample of the peak shaving propane-air mixture flowing in conduit 47 is withdrawn and supplied through pipe 48 to a suitable calorimetric device, such as that shown schematically at 49. The calorimeter 49 is preferably of the quick-acting type disclosed and claimed in the Schmidt Patent No. 2,002,279, granted May 21, 1935, for Calorimetric Method and Apparatus Adapted for Gas Mixing Control. Calorimeter 49 has associated therewith a peak shaving gas B. t. u. scheduling rheostat 50 (which is properly designed to provide resistance values, at different points in the range of movement of contactor 50ª, which will correspond substantially exactly with the required minimum heating values of the peak shaving gas, according to the percentage of the latter in the total flow of gas supplied to distribution line 11, Fig. 1). Such required variations in B. t. u. per cubic foot of the peak shaving gas in accordance with variations in the rate of demand for the latter are illustrated graphically in Fig. 3 hereof, as hereinafter more fully explained.

By linking the contactor 50ª of rheostat 50, designed and/or calibrated in the manner aforedescribed, with the operating mechanism for the duplex valves 19 and 23, as indicated at 51 in Fig. 1, the total heating value per unit volume of the peak shaving propane-air mixture, supplied through conduit 47 to conduit 11, will be maintained at the minimum value which will not cause trouble on gas burning equipment when mixed with the base gas in the predetermined variable proportions established by the gas mixing control equipment illustrated in Fig. 1. Such equipment will therefore deliver to the distribution line 11 either base gas or a mixture of base gas and peak shaving gas with the minimum heating value which will not cause defective burner performance. The advantage of this arrangement, when the combined flows of base gas and peak shaving gas are sold on a volumetric basis, is apparent.

As shown in Fig. 1, the calorimetric device 49 acts, if necessary, to effect operation of a split-field reversible motor 52 in one direction or the other; motor 52 acting, through suitable speed-reducing gearing represented by numeral 52ª and a worm 52ᵇ to drive a nut 53, which is attached to a rod 54 for adjusting the position of a slider (not shown) of the character illustrated in Fig. 1 of said Schmidt and Brice Patent No. 1,999,740; whereby the volumetric proportionality of the flow of low pressure gas in portion 16ª of conduit 16 is varied with respect to the volumetric rate of flow of air in conduit 24. By this means the total heating value per unit volume of the peak shaving gas mixture flowing in conduit 47 is definitely controlled, in accordance with the volumetric rate of flow thereof, in a manner to minimize the heating value thereof under various conditions graphically depicted in Fig. 3.

If the base gas only (from conduit 10 in Fig. 1) is sold, and the ultimate consumer supplies the peak shaving gas, the same control system could be used; but in such an installation changes in the peak shaving gas heating value schedule would either be unnecessary or the required changes would be relatively small. However, in certain critical burner applications at least minor controlled variations in the peak shaving gas heating value would be desirable. The desired variations would again be related to proportionalities of flows, and would correspondingly be related to the aforementioned joint variations in the positions of the duplex valves 19 and 23.

Although we have specifically described our invention as applied to a system involving the use of carbureted water gas as the base gas, it is to be understood that the invention is adaptable for use in systems wherein the base gas is other than carbureted water gas. Thus if the base gas consists of natural gas, a relationship of volumetric proportionality and total heating value per unit volume of the peak shaving gas mixture with respect thereto similar to that illustrated in Fig. 3 will apply; except, of course, that the magnitude of the total heating values per unit volume of the base and peak shaving gases will be higher.

Various slight modifications in the form and arrangement of the parts of the control system illustrated in Fig. 1 will at once suggest themselves to those skilled in this art. For example, a high pressure air storage tank might be substituted for the blower 29 shown in Fig. 1. Various well known accessories might also be incorporated in the gas mixing control system. For example, a pressure responsive alarm switch might be associated with conduit 10 to indicate a failure of pressure of the base gas supply. Similarly, known forms of shut-off devices might be associated with the conduits 16, 24, and 47 to respond to failure of pressure of the peak shaving gas or vapor.

Referring more particularly to Fig. 3, we have graphically illustrated the variation required in the total heating value per unit volume of a peak shaving gas-air mixture of the character herein specified, according to the required variations in the percentage of the total volumetric rate of flow (to distribution line 11 in Fig. 1, for example) which must be composed of the peak shaving gas-air mixture to satisfy the rate of demand from the distribution line. Thus the abscissa 55 bears legends to indicate the percentage of the total volumetric rate of flow of the base gas and the peak shaving gas-air mixture which must consist of the latter in order to satisfy the demand. The ordinate 56 bears legends to indicate the required quality, or minimum total heating value per unit volume, of the peak shaving gas-air mixture supplied for use in conjunction with a base gas having a substantially constant total heating value of 540 B. t. u. per cubic foot, as aforedescribed.

As indicated by the horizontal portion 57 of the graph, if the peak shaving gas-air mixture comprises fifteen per cent or less of the total volumetric rate of flow, the quality of said peak shaving gas-air mixture may likewise be maintained at approximately 540 B. t. u. per cubic foot without deleteriously affecting the combustion characteristics of the final mixture at the consumers' appliances. The curved portion 58 of the graph illustrates the gradual increase in the required total heating value per unit volume of the peak shaving gas-air mixture, as the latter is required to constitute a larger and larger percentage of the total volumetric rate of flow. Thus if one-half of the total volumetric rate of flow is required to be of the peak shaving gas-air mixture, the total heating value of the latter must be increased to 650 B. t. u. per cubic foot, as indicated at the point 58a in Fig. 3, and so on. Moreover, as aforestated, each of the total heating values of the peak shaving gas-air mixture indicated in the graph of Fig. 3 is the minimum value which we have found by experiment is satisfactory for our purpose (in that it has no deleterious effect upon the operation of the various types of consumer appliances, and in no case requires any readjustment of the latter). Such minimum value in each instance, of course, correspondingly reduces the cost to the gas distributing company of the additional gas required to satisfy the peak or abnormal rates of demand when they occur. Also, as aforeindicated, such minimum total heating value of the peak shaving gas-air mixture is in each instance substantially lower than the theoretically correct value, with a corresponding saving to the gas distributing company.

In each of Figs. 2 and 4 we have illustrated modifications wherein a flow of peak shaving gas at all times is contemplated; the volumetric proportionality of such flow, with respect to that of the base gas, being preselected and maintained under conditions of variation in the volumetric rate of flow of the base gas as an incident to variations in the rate of demand from the distribution line. Such an arrangement is desirable where the demand for gas in excess of the maximum base gas supply over an extended period can be anticipated. For example, let it be assumed that a given gas plant has a twenty-four hour capacity of 240,000 cubic feet, whereas it is estimated that the demand during the next twenty-four hours will be approximately 264,000 cubic feet of gas. By introducing peak shaving gas throughout such twenty-four hour period at a volumetric rate of flow equal to ten per cent of the total gas flow required to meet such demand it is possible, as aforedescribed, to have the peak shaving gas of a total heating value per unit volume the same as that of the base gas. In contrast with this, if the total required amount of peak shaving gas were introduced during only a part (that is, the portions of peak demand for gas) of the twenty-four hour period, the percentages of peak shaving gas would, of course, be substantially higher, and would likely require an increase in the total heating value per unit volume of the propane-air mixture, in order to avoid trouble on consumer appliances.

With such an arrangement it is, of course, assumed that in a system wherein the instantaneous volumetric rate of demand for gas is subject to relatively wide variations, a storage container for the temporary excess volumes of the mixture of base gas and peak shaving gas or of the base gas alone would be provided, in order to take full advantage of the maximum capacity of the base gas producing plant throughout the entire period.

Referring more particularly to Fig. 2, the numeral 58 designates a conduit through which the base gas is adapted to flow, either directly from a producing plant of the aforementioned capacity, or from a storage container associated with such plant. A so-called butterfly valve 59 is located within conduit 58, said valve being adapted to act as a metering device. Valve 59 is adjustable automatically to maintain a preselected value of the pressure drop thereacross. The adjusting means comprises a lever 60 rigidly attached to valve 59, and a lever 61 pivotally connected to lever 60 and to a rod 62 attached to a piston 63; the latter being slidable within a cylinder 64. Pipes 65 and 66 lead from opposite ends of cylinder 64 and have their outer ends arranged adjacent each other for cooperation with a movable jet or nozzle 67, which is connected with a source of fluid under pressure, as disclosed in the aforementioned Patent No. 1,999,740.

Pipes 68 and 69 are connected between conduit 58 at the upstream and downstream sides of valve 59 and the lower and upper chambers associated with a diaphragm 70. A stud 70a attached to diaphragm 70 has its end engaging the lower side of nozzle 67; a coiled spring 71 being interposed under compression between the opposite side of nozzle 67 and an abutment in the form of a manually adjustable screw or bolt 72. Assuming that the base gas is supplied to conduit 58 at a predetermined substantially constant pressure, it will be apparent that upon a given adjustment of screw 72 the valve 59 will be opened automatically to a degree necessary to maintain the preselected pressure drop thereacross, under conditions of variation in the rate of demand for gas from the distribution line 73.

The conduit 74 is adapted to be supplied with peak shaving gas (such as propane) from a suitable source, said conduit having therein a butterfly valve 75 and a butterfly valve 76. An air conduit 77 is supplied with air under pressure from a suitable source, such as the motor operated blower or pump 78; said conduit 77 having therein a butterfly valve 79. Valves 76 and 79 are of the duplex type, whereby the same when moved jointly are adapted to assume corresponding angular positions within their respective conduits. Thus said valves have rigidly attached thereto the levers 80 and 81, which are pivotally connected with a lever 82; the latter having an integral upper end portion 82a which is pivotally connected with a lever 83. Lever 83 is pivoted at 83a to a fixed support. A second oppositely extending lever 84 is pivoted at 84a to a fixed support. A pair of levers 85 and 86 are pivotally connected to each other and respectively to the lever 84 and the valve 59.

An adjustable slider block or roller 87 is interposed between the levers 83 and 84, as shown. The arrangement is preferably such that with roller 87 moved toward the right to a position in substantially vertical alinement with the lower end of lever 85 and the upper end of lever portion 82a each of the valves 76 and 79 will assume a rotary or angular position exactly corresponding with that of valve 59. Also with roller 87 in such position any degree of movement of valve 59 toward fully open or fully closed position will effect corresponding movement of valves 76 and 79 jointly. As shown, lever 83 is at all times biased toward lever 84, as by means of a headed rod or bolt 88 attached to lever 84, with a coiled compression spring 89 interposed between the bolt head and the outer surface of lever 83.

In like manner, if roller 87 is moved toward its extreme left-hand position, as illustrated, the valves 76 and 79 will be moved toward more nearly closed positions than the valve 59 when the latter is in a fully opened or partially opened position. Adjustment of roller 87 may be effected at will in any suitable manner, as by means of a pair of links or rods 90 and 91, which are preferably pivotally connected at 90a; rod 90 being attached to roller 87 and rod 91 having a screw-threaded right-hand end 91a which is adapted to cooperate with an internally threaded nut 92 which is held captive between a pair of abutments 93 and 94. Nut 92 is provided with an intermediate enlargement 92a to facilitate manual rotation thereof. A rod 95 has a screw-threaded end 95a for cooperation with the other end of nut 92; so that as the rod 91 moves endwise in each direction the rod 95 will move endwise in an opposite direction. Rod 95 is slidably supported by a perforated lug upon a suitable member 96; the right-hand end of rod 95 having a contactor 97 attached thereto and insulated therefrom, as diagrammatically illustrated at 98; said contactor 97 being adapted to cooperate with a peak shaving gas B. t. u. scheduling rheostat 99 of the aforementioned character shown at 50 in Fig. 1.

As shown in Fig. 2, the valves 75, 76 and 79 are operable automatically in a well known manner to normally insure a predetermined proportionality of the volumetric rate of flow of propane through conduit 74 with respect to the volumetric rate of flow of air through conduit 77. Such flow proportioning means is in general like that shown in Fig. 1 of the aforementioned Patent No. 1,999,740, to which reference may be had for a more detailed description of the construction and mode of operation thereof. Thus I have shown a device 100 which comprises essentially a nozzle 100ª the instantaneous position of which is controlled in response to the differential value of the pressure drops across valves 76 and 79, as ascertained by diaphragms 100ᵇ and 100ᶜ. The lower and upper sides of diaphragm 100ᵇ are subjected to the fluid pressures at the upstream and downstream sides respectively of valve 76, through the medium of pipes 100ᵈ and 100ᵉ; whereas the upper and lower sides of diaphragm 100ᶜ are subjected to the fluid pressures at the upstream and downstream sides respectively of valve 79, through the medium of pipes 100ᶠ and 100ᵍ.

A slider block 100ʰ is initially manually adjusted to provide the required proportionality between the volumetric rates of flow of air through conduit 77 and propane through conduit 74 to afford a mixture of the desired total heating value per unit volume flowing through conduit 101 for mixture with the base gas flowing through conduit 58. Thus if said base gas has a total heating value per unit volume of 540 B. t. u. per cubic foot, the peak shaving gas flowing in conduit 101 will normally have the same heating value. Moreover, if the rate of flow of base gas is increased through farther opening of valve 59 to satisfy an increase in the rate of demand from conduit 73, the means aforedescribed will act to effect a proportional degree of opening of valves 79 and 76. Such opening of valve 79 will immediately result in a corresponding increase in the rate of flow of air through conduit 77, and the device 100 will act in a well known manner through pipes 100ⁱ, 100ʲ with respect to a piston 100ᵏ in cylinder 100ˡ, through rod 100ᵐ and levers 100ⁿ, 100ᵒ to automatically adjust the position of valve 75 to provide a proportional increase in the rate of flow of propane, thus restoring and maintaining the preselected proportionality of the flows of air and propane.

The peak shaving gas B. t. u. scheduling rheostat 99 is designed and calibrated in the manner set forth in the description of rheostat 50 of Fig. 1. That is to say, if it is desired to maintain the volumetric rate of flow of peak shaving gas, through conduit 101, at a value corresponding to ten per cent (or not more than fifteen per cent) of the volumetric rate of flow through distribution line 73, the rheostat 99 will have no effect upon the total heating value per unit volume of the peak shaving gas supplied to said conduit 101. On the other hand, the calorimetric device 49 (like that described in Fig. 1) will act in response to any variations in the total heating value of the sample extracted through pipe 48 to effect proper proportioning of the volumetric rates of flow of air (through conduit 77) and propane (through conduit 74) to maintain the same at the value preselected therefor; any such adjustment being effected automatically by motor 52 acting (through elements 52ª, 52ᵇ, 53 and 54) upon slider block 100ʰ in the well known manner.

In the device of Fig. 2 it is to be understood that the butterfly valves 59, 76, 79 and 75 are so designed that a predetermined degree of rotary or angular movement of the disks thereof will effect a corresponding percentage change in fluid flow therethrough. The valve 59 in the base gas conduit 58 will therefore assume an angular position proportional to the volumetric rate of flow of gas through conduit 58, and this position is normally transmitted to the valves 76 and 79 in the propane and air lines, through the medium of the levers 83 and 84 and interposed roller or slider 87, when the latter is in its aforementioned neutral position. With valve 59 closed the arrangement is such that valves 76 and 79 would also be closed. With valve 59 fully opened the duplex valves 76 and 79 would be opened to a degree depending upon the position of the hand set roller or slider block 87 which has associated therewith the aforementioned rheostat 99.

The pressure in the conduit 73 is normally maintained at some predetermined distribution pressure by any suitable means (not shown in Fig. 2) in conduit 58. The air blower 78 supplies a substantially constant discharge pressure, so that the flow of air is determined by the position of the duplex valve 79 in the air line 77. The flow control valve 75 in the propane line 74, actuated by piston 100ᵏ controls the flow of propane at a rate to establish a pressure drop across the duplex valve 76 which is proportional to the pressure drop across the valve 79. The exact proportionality of air and propane pressure drops (and rates of flow) is adjustable over a fixed range by the motor operated adjuster 100ʰ, the operation of which is controlled by the calorimetric device 49. The control point of the latter is in turn controlled by the rheostat 99 associated with roller 87, which is manually preset at the desired position.

Assuming that it is desired to have the propane-air mixture supplied through conduit 101 constitute ten per cent of the total volumetric rate of flow through distribution line 73; it will be understood that with the valves 59, 79 and 76 initially closed, the manual adjustment of roller 87 and rheostat contactor 97 would not change the setting of valves 79 and 76. However, as the metering valve 59 moves toward fully opened position, under the influence of the required volumetric rate of flow of base gas through conduit 58, the duplex valves 79 and 76 will open proportionately; the degree of opening of the latter depending upon the preselected ratio setting (of roller 87) and the degree of opening of metering valve 59. With roller 87 so positioned that the peak shaving gas supplied from conduit 101 forms ten per cent or less of the mixture flowing in distribution line 73, the rheostat 99 would then maintain the control point setting of the calorimetric device 49 to provide a peak shaving gas-air mixture of a total heating value per unit volume substantially equal to that of the base gas flowing in conduit 58. However, when the proportionality of peak shaving gas is increased to more than fifteen per cent of the total flow through line 73, the necessary increase in the control point setting of calorimetric device 49 is automatically changed as a result of movement of rheostat contactor 97 as an incident to adjustment of roller 87.

The gas mixing control system diagrammatically illustrated in Fig. 4 is functionally quite similar to that of Fig. 2. However, in Fig. 4 the conduit 102 through which the base gas is adapted to flow is provided with a metering device in the form of a fixed orifice 103. Any suitable means (not shown) may be employed for insuring maintenance of a predetermined pressure of the base gas at the upstream side of orifice 103, whereby a predetermined pressure will normally be provided in the distribution line, notwithstanding variations in the rate of demand from the latter. By way of an example, it may be assumed that the base gas supplied from conduit 102 to distribution line 104 has a total heating value per unit volume of 540 B. t. u. per cubic foot.

The peak shaving gas, such as propane, is supplied from a suitable source to conduit 105; and air for mixture therewith is supplied, by blower 106, for example, to conduit 107. The peak shaving gas and air mix with each other during their flow through conduit 108 to distribution line 104. Conduits 105 and 107 are respectively provided with butterfly valves 109 and 110; said valves being of the duplex type; the same having like angular positions and the same (when moved) being constrained to move jointly to like degrees through the medium of linkage 111, 112 and 113.

Conduits 105 and 107 are also respectively provided with valves 114 and 115, which are adjustable automatically to normally maintain substantially constant the preselected values of the pressure drops across the respective valves 109 and 110 aforementioned.

Thus a pair of pipes 116 and 117 lead from the upstream and downstream sides of valve 109 to the chambers at the upper and lower surfaces respectively of a diaphragm 118 having associated therewith a stud 119 which engages the upper side of a nozzle 120 connected to a suitable source of fluid under pressure. Nozzle 120 cooperates with the adjacent open ends of pipes 121 and 122 leading to opposite ends of a cylinder 123 having therein a piston 124; the latter being connected by rod 125 and link 126 with lever 127 attached to valve 114. A spring 128 is interposed between the lower side of nozzle 120 and an adjustable abutment 129. The degree of compression of spring 128 may be initially manually adjusted in any suitable manner to preselect the value of the pressure drop across valve 109, and hence the angular position of valve 114 for any given adjustment of valve 109. Normally, however, the degree of compression of spring 128 is merely subject to automatic control by operation of a reversible electric motor 130 through the medium of reduction gearing 131 and an associated crank 132, to effect either an increase or a decrease in the degree of compression of spring 128. Motor 130 is in turn subject to control by the action of a calorimetric device 49, like that of Figs. 1 and 2, to normally maintain the mixture of peak shaving gas and air at the aforementioned total heating value of 540 B. t. u. per cubic foot, so long as the volumetric rate of flow thereof does not exceed fifteen per cent of the total volumetric rate of flow through distribution line 104.

The valve 115 is likewise adjusted automatically in response to automatic adjustment of valve 110 (jointly with valve 109), whereby the pressure drop across valve 110 is maintained substantially constant and normally proportional to the pressure drop across valve 109. The means associated with valves 110 and 115 for effecting such adjustment of the latter are, for the most part, identical with the elements associated with valves 109 and 114, as indicated by corresponding numerals of reference. However, the compression spring 128ᵃ is interposed between the lower side of nozzle 120 and a manually adjustable abutment in the form of a screw or stud 133; the latter being manually adjusted upon installation of the system to so proportion the flow of air through conduit 107 as to provide the desired total heating value per unit volume of the mixture flowing in conduit 108, when the volumetric rate of flow of the latter does not exceed fifteen per cent of the total flow through distribution line 104.

Means are provided for normally automatically insuring that the volumetric rate of flow of peak shaving gas through conduit 108 shall constitute a preselected proportion (say one-tenth) of the total volumetric rate of flow through distribution line 104. Said means comprises a pair of pipes 134 and 135 respectively connected with conduit 102 between the upstream and downstream sides of orifice 103 and the chambers at the upper and lower surfaces of a diaphragm 136. A stud 137 is attached to and projects downwardly from diaphragm 136 for engagement with the upper side of a nozzle 138 connected in the usual manner with a source of fluid under pressure. A coiled compression spring 139 is interposed between the lower side of nozzle 138 and an abutment 140, which is adjustable automatically in the manner hereinafter described. Assuming a given adjustment of abutment 140, the arrangement is such that upon a variation in the volumetric rate of flow of base gas through conduit 102 the associated means will provide for a corresponding or proportional variation in the volumetric rate of flow of peak shaving gas through conduit 108, so that the percentage quantity of the latter will be maintained constant at the value preselected therefor.

Thus, in the event of an increased demand from distribution line 104, the pressure at the downstream side of orifice 103 would be lowered, and as a consequence diaphragm 136 would effect downward movement of stud 137 to bring nozzle 138 into partial or full alinement with the end of a pipe 141 leading to the left-hand end of a cylinder 142, with resultant movement of piston 143 toward the right. Upon such movement of piston 143 the cam member 155 attached thereto will automatically effect adjustment of abutment 140 to increase the loading of spring 139 until the jet 138 is restored to neutral position; in this manner insuring the required degrees of opening of the respective valves 109, 114 and 110, 115 to provide the required volumetric rate of flow of the propane-air mixture from conduit 108 to distribution line 104 to meet the demand for the latter. As will be apparent, such increased rate of flow of the propane-air mixture will restore the desired distribution pressure in line 104. Piston rod 144 has a pin and slot connection 145 with a lever having angularly arranged arms 146 and 147 and a fixed point of pivotal support at 148. Arm 147 is so arranged with respect to a lever 149 (having a fixed pivot at 150) that any up or down movement of arm 147 is transmitted to said lever 149. Such movement is transmitted through the medium of a manually adjustable slider block in the form of a roller 151; suitable means, such as a headed stud 152 and a coiled compression spring 153 being interposed between arm 147 and lever 149 to resiliently bias the latter and roller 151 toward arm 147.

Under the condition last mentioned the downward movement of arm 147 and lever 149 will be transmitted, through a lever 154 to the aforementioned levers 113, 112 and 111, to effect the required degree of joint movement of valves 109 and 110 toward fully open position to provide the desired increase in the volumetric rate of flow of peak shaving gas through conduit 108; the aforedescribed means acting automatically to effect the necessary movements of valves 114 and 115 to maintain the total heating value per unit volume of the peak shaving gas substantially constant.

In the event that it is desired to increase or decrease the volumetric proportionality of the peak shaving gas flowing through conduit 108 (with respect to the total volume flowing in distribution line 104), this may be effected by manually adjusting the position of roller 151 with respect to arm 147 and lever 149. Thus roller 151 has attached thereto a yoke member 151ᵃ, which is pivotally connected at 151ᵇ to a rod 91, whose right-hand end 91ᵃ is screw-threaded for cooperation with a rotatable nut 92. Nut 92 is held against endwise movement between a pair of fixed abutments 93 and 94, as described in connection with the system of Fig. 2. Nut 92 is shown as provided with an enlarged portion 92ᵃ to facilitate manual rotation thereof. Also, as shown, nut 92 is adapted for simultaneous cooperation with the threaded end 95ᵃ of a rod 95, which has attached thereto (but insulated therefrom, as indicated at 98) a contactor 97 for cooperation with the resistance of rheostat 99.

As aforedescribed, the arrangement is such that when nut 92 is manually adjusted to provide a volumetric rate of flow of the peak shaving gas which is greater than fifteen per cent of the total flow through distribution line 104, the setting of rheostat contactor 97 will be such as to set the calorimetric device 49 to maintain a predetermined higher total heating value of the peak shaving gas flowing in conduit 108, as indicated by the values graphically illustrated in Fig. 3.

We claim:

1. In a method of control of gas mixing for peak shaving, the steps which comprise, effecting a flow of base gas at a predetermined substantially constant pressure, and of a predetermined substantially constant total heating value per unit volume, at a volumetric rate variable with the rate of demand from a distribution line, simultaneously effecting for continuous mixture with said flow of base gas a flow of peak shaving gas comprising not more than a predetermined percentage of the total volumetric rate of flow to said distribution line and having a total heating value and a pressure substantially corresponding to those of said base gas when supplied to said distribution line, whereby the mixture of base and peak shaving gases will have the desired combustion characteristics when used in consumer appliances, and when the rate of demand from said distribution line requires an increase in the percentage flow of said peak shaving gas above said predetermined percentage as an incident to attainment of the maximum volumetric rate of flow of said base gas simultaneously increasing the total heating value per unit volume of said peak shaving gas in accordance with a predetermined schedule to avoid undesirable combustion characteristics in the mixture of base and peak shaving gases.

2. In a method of control of gas mixing involving a base gas supply and an auxiliary liquid petroleum gas supply, wherein the total volume of the base gas supply during a given period is insufficient to satisfy the demand, the steps which consist in continuously effecting predetermined percentage flows of the base and auxiliary gases of sufficient volume to jointly satisfy the instantaneous rate of demand, substantially simultaneously effecting proportional variations in the respective volumetric rates of flow of base and auxiliary gases to compensate for variations in the instantaneous volumetric rate of demand, and when the rate of demand requires an increase in the percentage flow of said auxiliary gas above a predetermined percentage as an incident to the attainment of the maximum volumetric rate of flow of said base gas simultaneously increasing the total heating value per unit volume of said auxiliary gas in accordance with a predetermined schedule to avoid undesirable combustion characteristics in said mixture of base and auxiliary gases.

3. In a method of control of gas mixing involving a base gas supply and an auxiliary liquid petroleum gas supply, wherein the total volume of the base gas supply during a given period is insufficient to satisfy the demand, the steps which consist in effecting predetermined percentage flows of the base and auxiliary gases of sufficient volume to jointly satisfy the instantaneous rate of demand, substantially simultaneously effecting proportional variations in the respective volumetric rates of flow of base and auxiliary gases to compensate for variations in the instantaneous volumetric rate of demand, the normal volumetric rate of flow of said auxiliary gas being not in excess of a predetermined percentage of the total flow of gases, whereby base and auxiliary gases of like total heating value per unit volume may be employed, and under given conditions increasing the volumetric rate of flow of said auxiliary gas above said predetermined percentage of the total gas flow while simultaneously increasing the total heating value per unit volume of said auxiliary gas in a manner to avoid undesirable combustion characteristics of the mixture of base and auxiliary gases in respect to use on consumer appliances.

4. In a method of control of gas mixing involving a base gas supply and an auxiliary gas supply, wherein the total volume of the base gas supply during a given period is insufficient to satisfy the demand, the steps which consist in normally effecting a flow of base gas at a volumetric rate which is adapted to satisfy a predetermined percentage of the instantaneous rate of demand, and simultaneously effecting a flow of auxiliary gas at a volumetric rate adapted to satisfy the remainder of the instantaneous rate of demand, said base and auxiliary gases being of like total heating value per unit volume, simultaneously effecting proportional increases in the volumetric rates of flow of base and auxiliary gases to compensate for increases in the instantaneous rate of demand, thereafter effecting an increase in the volumetric rate of flow of the auxiliary gas only when the maximum volumetric rate of flow of base gas has been attained, and when the rate of demand requires an increase in the percentage flow of said auxiliary gas above fifteen per cent of the total volumetric rate of flow increasing the total heating value per unit volume of said auxiliary gas in accordance with a predetermined schedule to avoid undesirable combustion characteristics in said mixture of base and auxiliary gases.

5. In a gas mixing control system involving use of a base gas supply and an auxiliary liquid petroleum gas supply, wherein the total volume of the base gas supplied during a given period is insufficient to satisfy the demand, in combination, means to effect predetermined percentage flows of the base and auxiliary gases of sufficient volume to jointly satisfy the instantaneous rate of demand, means responsive to variations in the instantaneous volumetric rate of demand to simultaneously effect proportional variations in the respective volumetric rates of flow of base and auxiliary gases, the volumetric rate of flow of said auxiliary gas being less than a predetermined percentage of the total flow of gases, whereby base and auxiliary gases of like total heating values per unit volume may be employed without requiring any adjustment of consumer appliances, means for increasing the volumetric rate of flow of said auxiliary gas above said predetermined percentage of the total gas flow under given conditions, and means subject to control by said last mentioned means for simultaneously increasing the total heating value per unit volume of said auxiliary gas in a manner to avoid undesirable combustion characteristics of the mixture of base and auxiliary gases when used in consumer appliances.

6. In a gas mixing control system involving use of a base gas supply and an auxiliary gas supply, wherein the total volume of the base gas supply during a twenty-four hour period is insufficient to satisfy the demand, in combination, means to effect a flow of base gas at a volumetric rate which is adapted to satisfy a predetermined percentage of the instantaneous rate of demand, means subject to control by said last mentioned means to simultaneously effect a flow of auxiliary gas at a volumetric rate adapted to satisfy the remainder of the instantaneous rate of demand, said base and auxiliary gases being normally of like total heating values per unit volume, means responsive to increases in the instantaneous rate of demand to simultaneously effect proportional increases in the volumetric rates of flow of said base and auxiliary gases, means connected to said second-mentioned means to thereafter effect an increase in the volumetric rate of flow of the auxiliary gas only when the maximum volumetric rate of flow of base gas has been attained, and said last mentioned means including means to increase the total heating value per unit volume of said auxiliary gas according to a predetermined schedule to avoid undesirable combustion characteristics in said mixture of base and auxiliary gases when the volumetric rate of flow of said auxiliary gas thereof exceeds fifteen per cent of the total volumetric rate of flow.

7. In a gas mixing control system, in combination, a distribution line connected to a source of base gas the total volumetric rate of flow of which is insufficient to satisfy the demand of said distribution line for a given period of time, said base gas having a substantially constant total heating value per unit volume and being supplied at a volumetric rate variable with the rate of demand of said distribution line to provide a predetermined substantially constant pressure in said line; means for continuously supplying to said distribution line a flow of auxiliary gas at a pressure substantially corresponding to that above mentioned to supplement said flow of base gas, said last mentioned means including flow controlling means for controlling the rate of flow of said auxiliary gas; and proportionality selecting means responsive to said base gas rate of flow for effecting actuation of said auxiliary gas flow controlling means to effect an auxiliary gas volumetric rate of flow which is substantially continuously a preselected proportion of said base gas rate of flow, said proportionality selecting means including calorimetric means for increasing the total heating value of said auxiliary gas in accordance with a predetermined schedule when said auxiliary gas exceeds a predetermined proportion of the total flow through said distribution line, said scheduling being such as to minimize the excess in total heating value per unit volume of the mixture of base and auxiliary gases.

8. In a gas mixing control system, in combination, a distribution line; means for supplying to said distribution line a portion or all of a predetermined maximum volumetric rate of flow of a base gas of predetermined total heating value per unit volume in accordance with the rate of demand for the latter to normally maintain in said distribution line a substantially constant predetermined pressure; a source of auxiliary gas connected to said distribution line for continuous introduction thereinto; and proportionality selecting means responsive to said base gas rate of flow to effect a preselected proportional flow of said auxiliary gas by limiting the flow thereof whereby the total volumetric rate of flow through said distribution line for a given period of time is increased by the percentage proportion so selected, said last mentioned means including calorimetric means for varying in accordance with a preselected schedule the heating value of said auxiliary gas as said selected percentage proportion is varied.

References Cited in the file of this patent

UNITED STATES PATENTS 2,193,240  Schmidt _____ Mar. 12, 1940

OTHER REFERENCES

Gas, vol. 15, No. 5, pp. 48–50, 54 (1939); vol. 15, No. 12, pp. 42–44 (1939); vol. 17, No. 2, pp. 21–24 (1941); vol. 18, No. 7, pp. 20–22 (1942); and vol. 21, No. 4, pp. 21–24 (1945).